US00RE44515E

(19) United States
(12) Reissued Patent
Ciungan et al.

(10) Patent Number: US RE44,515 E
(45) Date of Reissued Patent: Oct. 8, 2013

(54) MOUNTING PLATE

(75) Inventors: Marcel Ciungan, Arlington Heights, IL (US); Dugan O'Keene, Forest Park, IL (US)

(73) Assignee: Peerless Industries, Inc., Aurora, IL (US)

(21) Appl. No.: 29/335,520

(22) Filed: Apr. 16, 2009

Related U.S. Patent Documents

Reissue of:
(64) Patent No.: Des. 558,562
Issued: Jan. 1, 2008
Appl. No.: 29/264,330
Filed: Aug. 8, 2006

(51) LOC (9) Cl. ..... 08-05
(52) U.S. Cl.
USPC ..... D8/363; D14/452; D8/354
(58) Field of Classification Search
USPC ..... D8/349, 354, 363, 373; 248/274.1, 248/284.1, 278.1; D14/451–452
See application file for complete search history.

(56) References Cited

U.S. PATENT DOCUMENTS 5,751,548 A 5/1998 Hall et al.

(Continued)

OTHER PUBLICATIONS

"Installation and Assembly: Articulating LCD Wall Arm," Installation Instructions. Peerless Industries, Inc., Issued May 18, 2005.

*Primary Examiner* — Phillip S Hyder
(74) *Attorney, Agent, or Firm* — Foley & Lardner LLP

(57) CLAIM

We claim the ornamental design for a [articulating mount unit] *mounting plate*, as shown and described.

DESCRIPTION

[FIG. 1 is a perspective view of the articulating mount unit showing our new design;]
[FIG. 2 is a left side view thereof;]
[FIG. 3 is a right side view thereof;]
[FIG. 4 is a front view thereof;]
[FIG. 5 is a rear view thereof;]
[FIG. 6 is a top plan view thereof;]
[FIG. 7 is a bottom view thereof;]
[FIG. 8 is a perspective view of another embodiment of the articulating mount unit showing our new design;]
[FIG. 9 is a left side view of the articulating mount unit in FIG. 8;]
[FIG. 10 is a right side view of the articulating mount unit in FIG. 8;]
[FIG. 11 is a front view of the articulating mount unit in FIG. 8;]
[FIG. 12 is rear view of the articulating mount unit in FIG. 8;]
[FIG. 13 is a top plan view of the articulating mount unit in FIG. 8; and,]
[FIG. 14 is a bottom view of the articulating mount unit in FIG. 8.]
[The broken lines in the drawings are for illustrative purposes only and form no part of the claimed design.]
*FIG. 15 is a perspective view of a mounting plate showing our new design;*
*FIG. 16 is a front view thereof;*
*FIG. 17 is a right side view thereof;*
*FIG. 18 is a left side view thereof;*
*FIG. 19 is a top plan view thereof; and,*
*FIG. 20 is a bottom view thereof.*

1 Claim, 3 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| 6,095,467 | A | 8/2000 | Neuhof | |
| D455,949 | S | 4/2002 | Huang | |
| 6,478,275 | B1 | 11/2002 | Huang | |
| D472,793 | S * | 4/2003 | Callahan et al. | D8/349 |
| 6,554,238 | B1 | 4/2003 | Hibberd | |
| 6,695,270 | B1 | 2/2004 | Smed | |
| D488,708 | S | 4/2004 | Lam et al. | |
| D489,599 | S | 5/2004 | Lam | |
| D496,367 | S | 9/2004 | Pfister | |
| D503,858 | S | 4/2005 | Ricci | |
| 6,905,101 | B1 | 6/2005 | Dittmer | |
| D507,477 | S | 7/2005 | Pfister | |
| 7,028,961 | B1 | 4/2006 | Dittmer et al. | |
| D538,633 | S * | 3/2007 | Ly Hau et al. | D8/363 |
| D539,123 | S * | 3/2007 | Ly Hau et al. | D8/363 |
| D543,548 | S * | 5/2007 | Muday et al. | D14/452 |
| D558,560 | S | 1/2008 | Ciungan | |
| D558,561 | S | 1/2008 | Ciungan | |
| D558,563 | S * | 1/2008 | Ciungan | D8/363 |
| D558,564 | S | 1/2008 | Ciungan | |
| D559,085 | S | 1/2008 | Yu | |
| D559,087 | S | 1/2008 | Ciungan | |
| D559,088 | S | 1/2008 | Ciungan | |
| D560,674 | S * | 1/2008 | Wohlford et al. | D14/451 |
| 2004/0245420 | A1 | 12/2004 | Pfister et al. | |
| 2005/0263659 | A1 | 12/2005 | Pfister et al. | |
| 2005/0263671 | A1 * | 12/2005 | Lo | 248/917 |

* cited by examiner

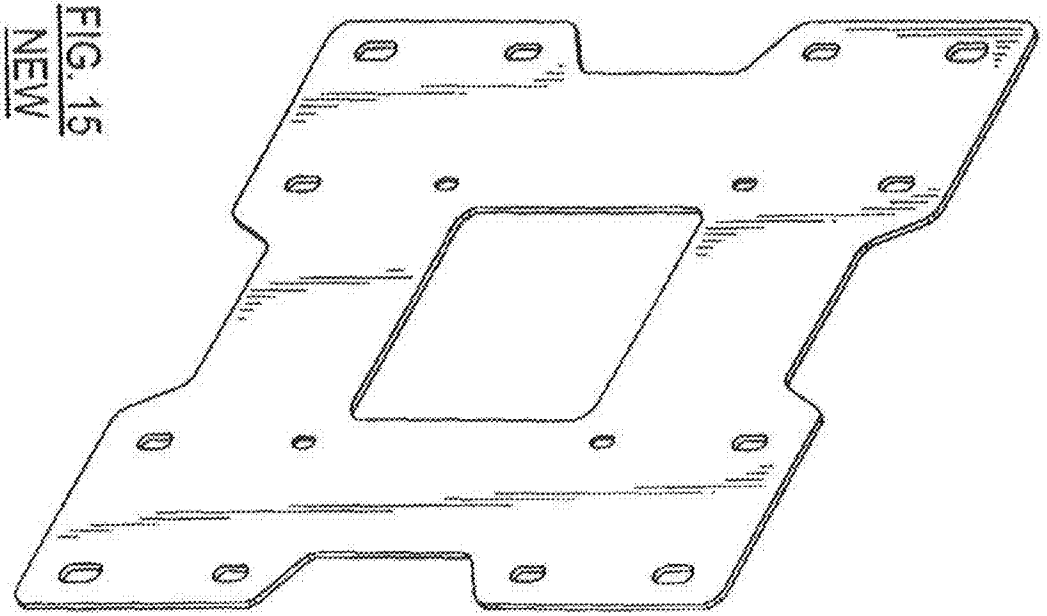
FIG. 15
NEW

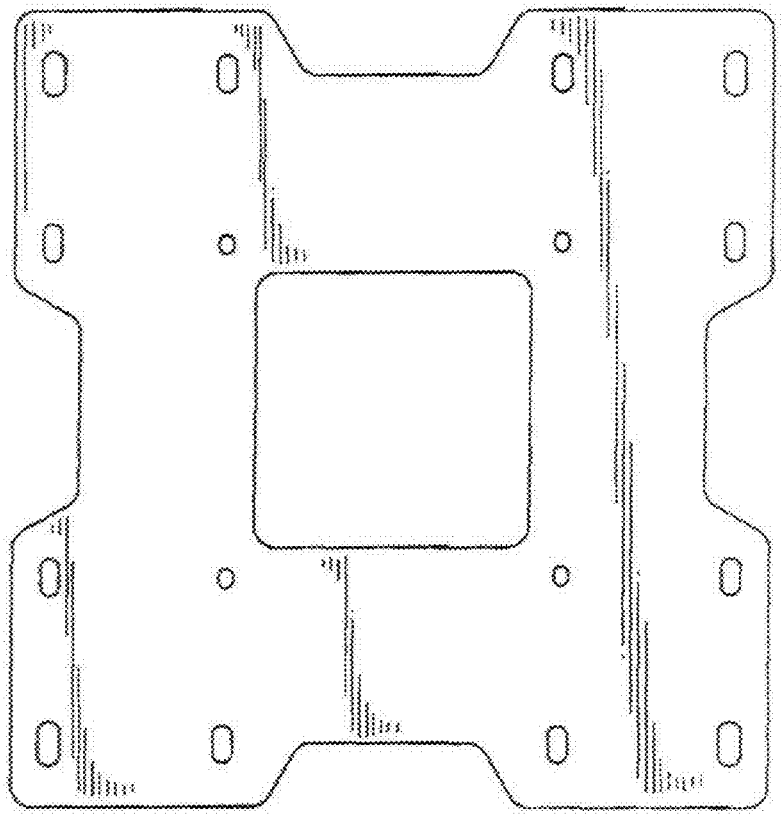
FIG. 16
NEW

FIG. 17
NEW
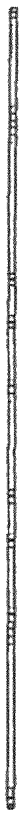
FIG. 18
NEW
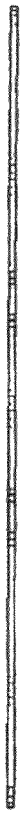
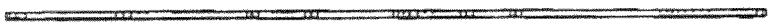
FIG. 19
NEW
FIG. 20
NEW